US011349709B2

(12) United States Patent
Muniyan et al.

(10) Patent No.: US 11,349,709 B2
(45) Date of Patent: May 31, 2022

(54) SYSTEM AND METHOD FOR ONBOARDING IOT DEVICES

(71) Applicant: Walmart Apollo, LLC, Bentonville, AR (US)

(72) Inventors: Kalaiselvan Muniyan, Bentonville, AR (US); Ramanujan Amaruviappan, Bentonville, AR (US); Joshua Don Segraves, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/788,870

(22) Filed: Feb. 12, 2020

(65) Prior Publication Data

US 2020/0259710 A1    Aug. 13, 2020

Related U.S. Application Data

(60) Provisional application No. 62/805,090, filed on Feb. 13, 2019.

(51) Int. Cl.
| | |
|---|---|
| *H04L 41/0806* | (2022.01) |
| *G06F 16/2455* | (2019.01) |
| *G06F 16/2458* | (2019.01) |
| *H04L 41/08* | (2022.01) |
| *G16Y 30/00* | (2020.01) |
| *G16Y 40/20* | (2020.01) |

(52) U.S. Cl.
CPC ...... *H04L 41/0806* (2013.01); *G06F 16/2474* (2019.01); *G06F 16/24568* (2019.01); *H04L 41/0889* (2013.01); *G16Y 30/00* (2020.01); *G16Y 40/20* (2020.01)

(58) Field of Classification Search
CPC ............ G06F 16/2468; G06F 16/2474; H04L 41/0889; G16Y 40/20; G16Y 30/00
USPC ....................................................... 709/222
See application file for complete search history.

(56) References Cited

U.S. PATENT DOCUMENTS

| | | | | |
|---|---|---|---|---|
| 2016/0135241 | A1* | 5/2016 | Gujral | H04L 67/12 |
| | | | | 370/328 |
| 2016/0308957 | A1* | 10/2016 | Zhang | G06F 9/4484 |
| 2017/0102693 | A1* | 4/2017 | Kidd | G05B 19/41875 |
| 2017/0187807 | A1* | 6/2017 | Clernon | H04L 41/0806 |
| 2017/0201585 | A1* | 7/2017 | Doraiswamy | H04L 67/2804 |
| 2017/0228661 | A1* | 8/2017 | Chien | G06Q 10/063 |
| 2018/0054490 | A1* | 2/2018 | Wadhwa | H04L 67/10 |
| 2018/0139125 | A1* | 5/2018 | Pasam | H04L 45/306 |
| 2018/0191867 | A1* | 7/2018 | Siebel | H04L 67/12 |
| 2019/0042378 | A1* | 2/2019 | Wouhaybi | H04L 69/40 |

* cited by examiner

*Primary Examiner* — Umar Cheema
*Assistant Examiner* — Tony Williams
(74) *Attorney, Agent, or Firm* — Fitch, Even, Tabin & Flannery LLP

(57) ABSTRACT

The system, method, and non-transitory computer readable medium described herein, automatically generates technical requirements using information provided by a user. The technical requirements can be used to onboard the IoT device and initiate communication between an IoT device and a controller and the controller and a cloud based distributed computing systems.

20 Claims, 15 Drawing Sheets

SYSTEM AND METHOD FOR ONBOARDING IOT DEVICES

RELATED APPLICATIONS

This application claims priority to and the benefit of U.S. Provisional Application No. 62/805,090, filed on Feb. 13, 2019, which is incorporated herein by reference in its entirety.

BACKGROUND

Onboarding Internet-of-Things (IoT) devices can be a long and error-prone process.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems, methods, and computer-readable media to establish communication with IoT devices. In one embodiment, an IoT device can be "on-boarded" to establish communication with a controller disposed in the same facility as the IoT device and to stream data collected by the controller from the IoT device to a cloud based distributed computing system. The cloud based distributed computing system can generate data analytics associated with the IoT device and can generate visualizations of the generated data analytics.

Conventionally, onboarding IoT devices can be a long and manual process. The system, method, and non-transitory computer readable medium described herein, automatically generate technical requirements that can be used to onboard the IoT device and initiate communication between an IoT device and a controller and between the controller and a cloud based distributed computing systems.

In one embodiment, the system can include a user device, a controller disposed in a facility, and a computing system in communication with the user device and the controller. The first computing system can be configured to receive information associated to a first IoT device disposed in the facility, translate the information into technical requirements associated with the first IoT device, and generate a first module in the controller using the information associated with the first IoT device to facilitate communication between the controller and the first IoT device. The first module can corresponds to the first IoT device. The computing system can subscribe to one or more distributed computing systems, to initiate communication of data associated with the first IoT device, between the controller and the one or more distributed computing systems. The controller can be configured to intake the data associated with the first IoT device, via the generated module, and stream the data to the one or more distributed computing systems.

The one or more distributed computing systems can be configured to perform data analytics using the data received from the controller and associated with the first IoT device. The one or more distributed computing system can include a first and second distributed computing system. The first distributed computing system can perform data analytics for data stored over a longer duration of time than the second distributed computing system. The data analytics can include generating a time series model for a short and long time duration of data. Second and third IoT devices can be disposed in the facility. The controller can generate a second module corresponding to the second IoT device and can generate a third module corresponding to the third IoT device. The first, second, and/or third IoT devices can include an Application Program Interface (API) to communicate with the first, second, and/or third modules of the controller, respectively.

Figure 1:
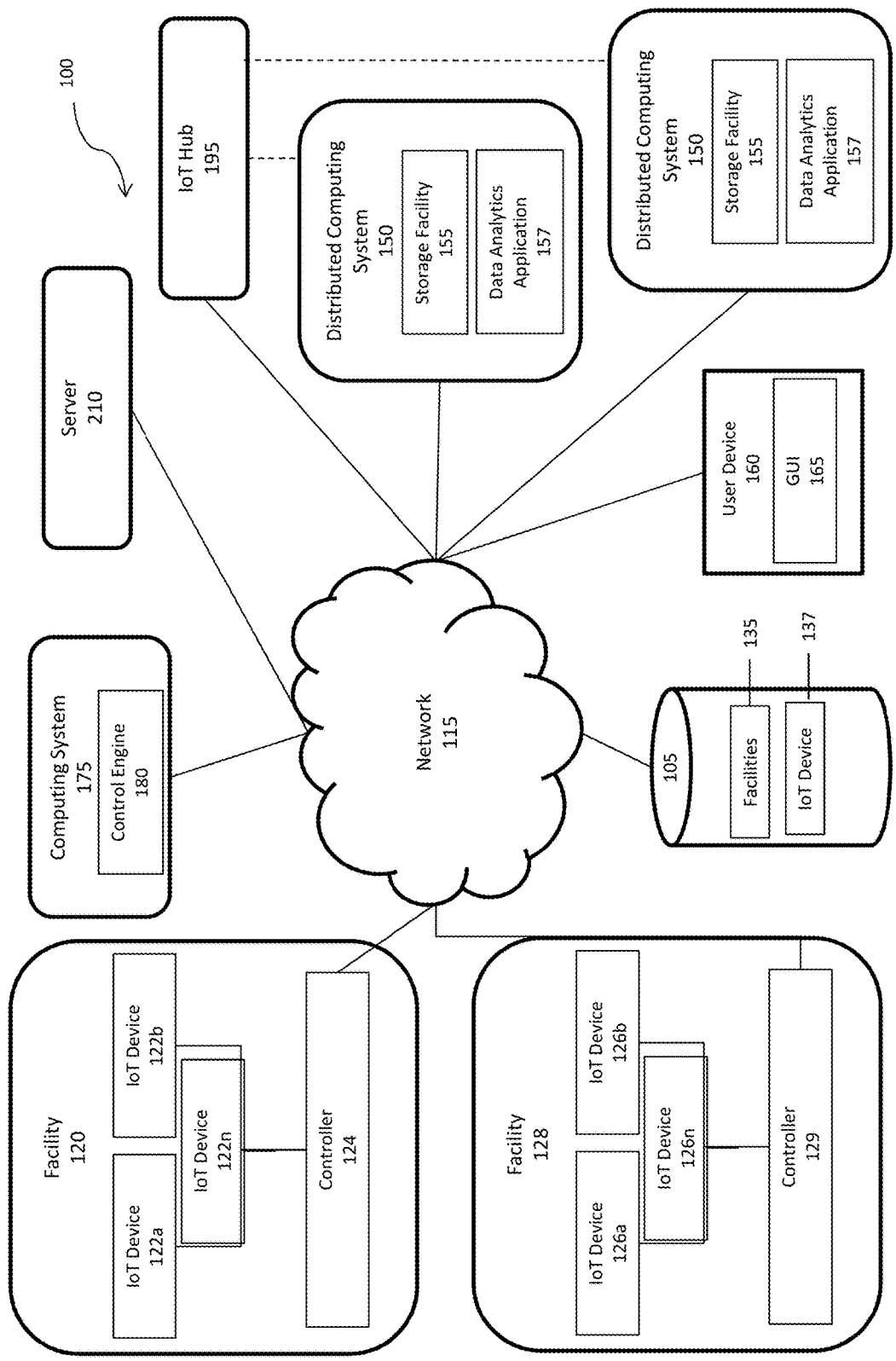
FIG. 1 is a network diagram of a system for onboarding IoT devices according to an exemplary embodiment of the present disclosure.

FIG. 1 is a network diagram of the system 100 for onboarding Internet of Things (IoT) devices according to an exemplary embodiment of the present disclosure. The system 100 for onboarding IoT devices can include one or more databases 105, one or more servers 210, one or more computing systems 175, one or more distributed computing systems 150, one or more IoT Hubs 195, and facilities 120 and 128 including IoT devices 122a-n, 126a-n, and controllers 124 and 129, respectively. In exemplary embodiments, the computing system 175 can be in communication with the databases 105, the server(s) 110, user devices 160, distributed computing systems 150, one or more IoT Hubs 195, and facilities 120 and 128 including IoT devices 122a-n, 126a-n, and controllers 124 and 129, via a communications network 115. The computing system 175 can execute a control engine 180 to implement the system 100 for onboarding IoT devices 122a-n, 126a-n. The IoT devices 122a-n, 126a-n can be any devices or appliance which contain electronics, software, sensors, actuators, and allow for connectivity which allows these devices to connect, interact and exchange data. For example, the IoT devices 122a-n, 126a-n can be one or more of autonomous devices, sensors, control devices, cameras, thermostats, and other electric devices with network connectivity.

In an example embodiment, one or more portions of the communications network 115 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 175, user devices 160, distributed computing systems 150, one or more IoT Hubs 195, and facilities 120 and 128 including IoT devices 122a-n, 126a-n, and controllers 124 and 129, via a communications network 115. The server 210 hosts one or more applications configured to interact with one or more components computing system 175 and/or facilitates access to the content of the databases 105. The databases 105 may store information/data, as described herein. For example, the databases 105 can include a facilities database 135. The facilities database 135 can store information associated with facilities and IoT devices in the facilities. The databases 105 can be located at one or more geographically distributed locations from the computing system 175. Alternatively, the databases 705 can be located at the same geographically as the computing system 700.

In one embodiment, a first facility 120 can include IoT devices 122a-n and a controller 124. The controllers 124 and 129 can be IoT edge devices and can include individual modules corresponding to each of the IoT devices 122a-n and/or 126a-n, respectively. The IoT devices 122a-n and/or 126a-n can communicate data (i.e., usage data or data collected) to the corresponding module in the controller 124 and/or 129. The modules is described in greater detail with respect to FIG. 2.

The controllers 124 and/or 129 can communicate the data collected to the distributed computing system 150. The distributed computing system 150 can include a storage facility 155 and a data analytics application 157. The distributed computing system 150 can store the data in the storage facility 155 and the data analytics engine 157 can generate data analytics using the stored data. The data analytics can be associated with the specific type of IoT device, facility, time duration, or a combination of any of the aforementioned. The controllers 124 can communicate with the distributed computing systems 150 using the IoT Hub 195. The distributed computing systems 150 can be cloud based systems.

A user device can input information associated with a request for onboarding IoT devices (that are not currently on-boarded) disposed in the first or second facility 120 or 128, using the GUI 165. The request can include information associated with the IoT device to be on-boarded and/or information associated with the first or second facility 120 or 128. The information included in the request is described in further detail with respect to FIGS. 6A-6C. The computing system 175 can receive the request. For example, the computing system 175 can receive a request to onboard the IoT device 122a in the facility 120. The control engine 180 can query the facilities database 135 to retrieve information associated with the facility 120 in which the IoT device 122a is disposed. The control engine 180 can query the IoT device database 137 to retrieve information associated with the IoT device 122a to be on-boarded. The control engine 180 can translate the received and retrieved information into technical requirements associated with the IoT device 122a to be on-boarded. The control engine 180 can interface with the controller 124 disposed in the facility 120 to generate a module in the controller 124 disposed in the facility 120 to facilitate communication between the controller 124 and the IoT device 122a to be on-boarded using the technical requirements. The module can correspond to the IoT device 122a.

The control engine 180 can further establish a subscription to one or more distributed computing systems 150, to initiate communication from the controller 124 or 129 to the one or more distributed computing systems 150. The distributed computing systems 150 can be associated with specific types of IoT devices and/or can be configured to perform specific types of data analytics. For example, the information included in the request can include an indication that the data streamed from the controller which is associated with the IoT device to be on boarded can be on a hot path. A hot path can be associated with a distributed computing system 150 which stores data for shorter periods of time and in turn executes data analytics on data collected over a shorter amount of time. Alternatively, the request for onboarding an IoT device can include an indication that the data streamed from the controller associated with the IoT device to be on boarded is to be streamed on a cold path. A cold path can be associated with the distributed computing system which stores data for longer periods of time and in turn generates data analytics for data collected over longer periods of time.

Figure 2:
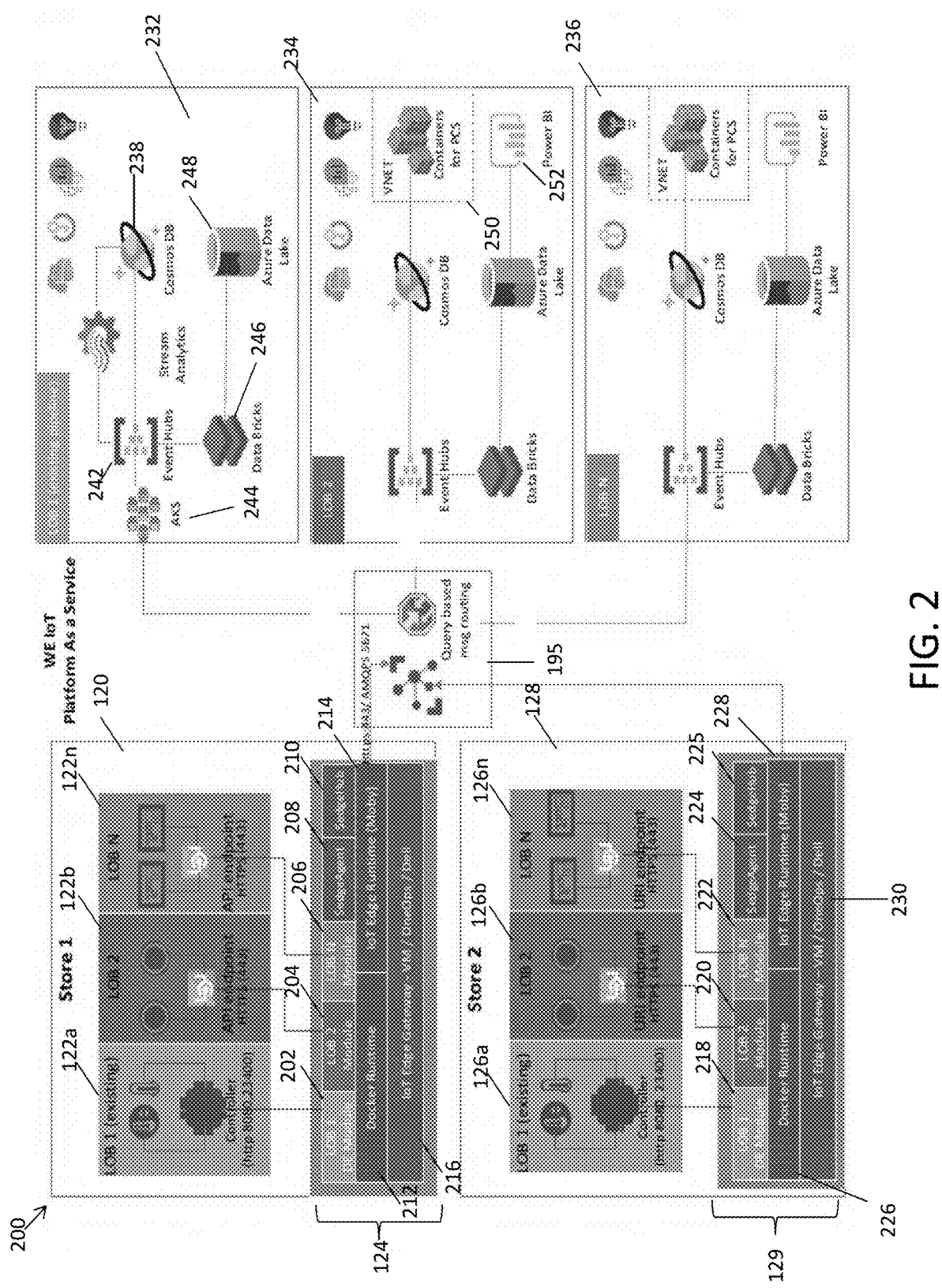
FIG. 2 is an architecture diagram of the system for onboarding IoT devices according to an exemplary embodiment of the present disclosure.

FIG. 2 is a diagram illustrating an architecture of an embodiment of the system for onboarding IoT devices according to an exemplary embodiment of the present disclosure. The architecture 200 of the system for onboarding IoT devices can include a first facility 120, a second facility 128, and IoT pipelines 232-236. As described above with respect to FIG. 1, IoT devices 122a-n can be disposed and operational in the first facility 120 and IoT devices 126a-n can be disposed and operational in the second facility 128. A first controller 124 can be disposed in the first facility 120, and a second controller 129 can be disposed in the second facility 128.

The first controller 124 can include an IoT module 202, an IoT module 204, an IoT module 206, a edgeAgent 208, a edgeHub 210, docker runtime 212, IoT edge runtime (Moby), and an IoT Edge Gateway 216. The second controller 129 can include an IoT module 218, an IoT module 220, an IoT module 222, an edgeAgnet 224, an edgeHub 225, docker runtime 226, IoT edge runtime (Moby) 228, and IoT edge gateway 230. The first and second controller 124 and 129 can be embodied as an IoT edge device.

The IoT modules 202-206, 218-222 can correspond to IoT devices 122a-122n and 126a-126n, respectively. In response to onboarding an IoT device disposed in a facility, an IoT module can be created in the respective controller to facilitate communication between the controller and the IoT device. For example, the IoT device 122a can communicate with the (first) IoT module 202 through a controller within the IoT device 122a. The IoT device 122b can communicate with the (second) IoT module 204 through an Application Program Interface (API). The IoT device 122n can communicate with the (third) IoT module 206 through an API. Likewise, the IoT device 126a can communicate with the (fourth) IoT module 218 through a controller within the IoT device 126a. The IoT device 126b can communicate with the (fifth) IoT module 220 through an Application Program Interface (API). The IoT device 126n can communicate with the (sixth) IoT module 222 through an API.

The edgeAgents 208 and 224 can be configured to instantiate modules (i.e., IoT modules 202-206 and 218-222). The edgeAgent 208 can ensure that the IoT module 202-206 continue to run and report the status of the IoT modules 202-206 to the IoT Hub 195. Likewise, edgeAgent 224 can ensure that the IoT modules 218-222 continue to run, and report the status of the IoT modules 218-222 to the IoT Hub 195. The edgeHubs 210 and 225 can act as a proxy for the IoT Hub 195 by exposing the same protocol endpoints as the IoT Hub 195. The edgeHubs 210 and 225 may not be a full version of IoT Hub 195. For example, edgeHubs 210 and 225 forward authentication requests to the IoT Hub 195 when the IoT devices first try to connect. After the first connection is established, security information is cached locally by edgeHubs 210 and 225. The edgeHubs 210 and 225 facilitate module-to-module communication. The edgeHubs 210 and 225 can be configured as message brokers to keep modules independent from each other.

The docker runtime 212 and 226 can be configured to provide container management. The IoT edge runtime 214 and 228 can be a collection of programs executed on an IoT edge device (i.e., first and second controllers 124 and 129). The IoT edge runtime 214 and 228 can enable IoT edge devices to receive code and run on the IoT edge devices, and communicate the results. The IoT edge gateways 216 and 230 can provide device connectivity and edge analytics to IoT devices (i.e., IoT devices 122a-n and 126a-n). The IoT edge gateways 216 and 230 can provide connectivity to the IoT hub 195. In turn, the IoT devices 122a-n and/or 126a-n can communicate with the distributed computing systems (e.g., distributed computing systems 150 as shown in FIG. 1) through the IoT Hub 195, using the IoT edge gateways 216 and 230. The IoT edge gateways 216 and 230 can follow the following patterns: transparent, protocol translation, or identity translation. The patterns can provide one or more of: edge analytics, downstream device isolation, connection multiplexing, traffic smoothing, and offline support.

The architecture 200 can further include an IoT Hub 195. The IoT hub 195 can receive data associated with the IoT devices 122a-n or 126a-n from the IoT edge gateways 216 and 230. For example, once on-boarded, the IoT devices 122a-n or 126a-n can transmit and receive data from their corresponding IoT modules 202-206 or 218-222. The IoT edge gateways 216 and 230 can receive the data associated with the IoT devices 122a-n and 126a-n from the respective corresponding IoT modules 202-206 and 218-222. The IoT edge gateways 216 and 230 can transmit the data to the IoT Hub 195.

The architecture 200 can further include IoT pipelines 232-236. The IoT pipelines 232-236 can be hosted by cloud computing systems or distributed computing systems (e.g., distributed computing systems 150 as shown in FIG. 1). Each pipeline can correspond to a type of IoT device. As a non-limiting example, types of IoT device can be sensors, autonomous device, or printers. For example, IoT device 122a and 126a can be of the same type; IoT device 122b and 126b can be of the same time; and IoT device 122n and 126n can be of the same time. The IoT pipeline 232 can correspond to the IoT device type of 122a and 126a; the IoT pipeline 234 can correspond to the device type of IoT device 122b and 126b; and the IoT pipeline 236 can correspond to the IoT device type of IoT device 122n and 126n. The IoT Hub 195 can route data from the IoT Edge Gateway 216 and 230 to the respective IoT pipelines 232-236.

Each of the IoT pipelines 232-236 can include a database 238, event hubs 242, data bricks 246, and data lakes 248. In a non-limiting example, the database 238 can be embodied as an Azure Cosmos DB. The database 238 can be a globally distributed, multi-model database service. The database 238 can elastically scale throughput and storage, and take advantage of fast, single-digit-millisecond data access using your favorite API among SQL, MongoDB, Cassandra, Tables, or Gremlin. The event hubs 242 can collect, transform, and store multiple different received events. The data bricks 246 can be configured to provide a unified analytics platform.

The data bricks 246 can be an application to provide streamlined workflows, interactive workspace, and enables collaboration. As an example, the data bricks 246 can work along with an Apache Spark—based analytics platform. The data lake 248 can be a system or repository of data stored in its natural format, usually object blobs or files. A data lake can be a single store of all enterprise data including raw copies of source system data and transformed data used for tasks such as reporting, visualization, analytics and machine learning.

As an example, the IoT pipelines 232-236 can receive data associated with the IoT devices 122a-n and 126a-n from the IoT Hub 195 at the event hubs 242. The event hubs 242 can stream the data to the database 238 and/or the data bricks 246. The database 238 can be a relational database and can store the received data. The data bricks 246 can execute data analytics on the received data and store the data analytics in the data lake 248.

The IoT pipelines 234 and 236 can also include VNet containers 250 and a power BI module 252. The VNet containers 250 can be a virtual network of containers which can receive data from the database 238. The power BI module 252 can be an interactive business intelligence data visualization platform. The power BI module 252 can receive the data analytics stored in the data lake 248 and generate visual representations for the data.

The IoT pipeline 232 can include an Azure Kubernetes Service (AKS) 244. The AKS 244 can manage hosted Kubernetes environment and the containerized and non-containerized applications in the environment.

Figure 3:
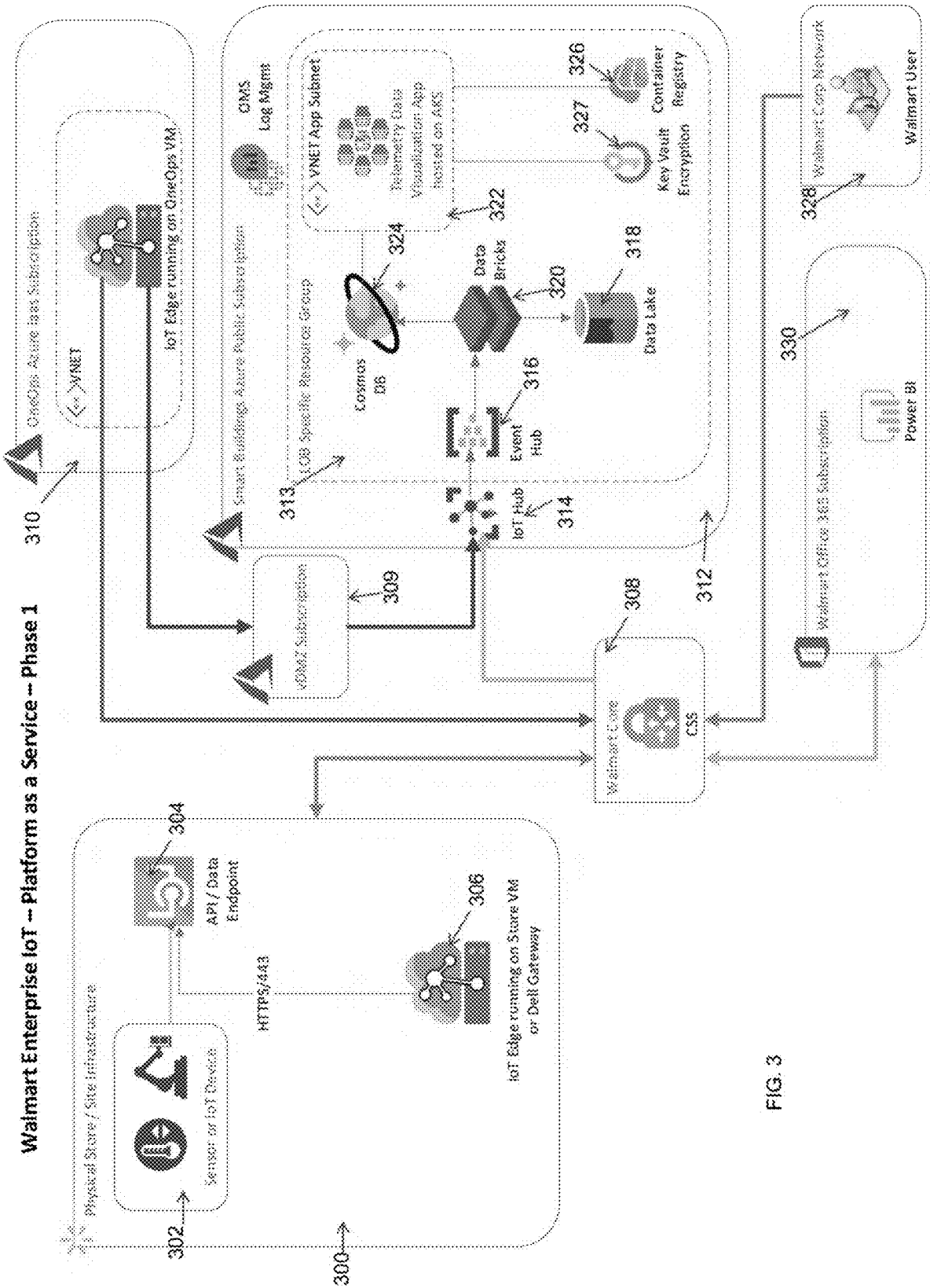
FIG. 3 is another architecture diagram of the system for onboarding IoT devices according to an exemplary embodiment of the present disclosure.

FIG. 3 is a diagram illustrating another architecture of an embodiment of the system for onboarding IoT devices according to an exemplary embodiment of the present disclosure. In one embodiment, the architecture 300 can include a facility 301 which can include an IoT device 302 and an IoT edge device 306. The IoT device 302 can communicate to the IoT edge device 306 through an API 304. The IoT edge device 306 can communicate with a core css 308. The core css 308 can be an ultra-minimal framework for web VPN based architecture.

The IoT edge device 306 can communicate data associated with the IoT device 302 to the core css 308. The core css 308 can communicate the data to the IoT Hub 314. The IoT Hub 314 can be hosted by a smart buildings public subscription 312. The IoT Hub 314 can communicate the data to an IoT pipeline 313. The IoT pipeline 313 can include event hubs 316, a database 324, data bricks 320, a data lake 318, telemetry data visualization application 322, a key vault encryption 327, and a container registry 326. The key vault encryption 327 can be configured to store and encrypt usernames and passwords associated with users on-boarding IoT devices. The smart buildings public subscription 312 and the IoT pipeline 313 can be hosted on distributed computing systems (e.g., distributed computing systems 150 as shown in FIG. 1) and/or cloud computing systems.

The IoT Hub 314 can communicate the data associated with an IoT device 302 to the IoT pipeline 313. The event hub 316 can receive the data and stream the data to the data bricks 320. The data bricks 320 can generate data analytics using the received data and transmit the data analytics to the database 324 and the data lake 318. The telemetry data visualization application 322 can generate visual depictions of the data analytics stored in the database 324.

The core css 308 can further communicate with an OneOps subscription 310. The OneOps subscription can include an IoT Edge device. The OneOps subscription 310 is a cloud and application lifecycle management system. The OneOps subscription 310 can be configured to launch new applications on cloud based architectures like the architecture 300. The OneOps subscription 310 can communicate with the IoT hub 314, via the DMZ subscription 309.

The core css 308 can further communicate with an office 365 subscription 330 including a power BI module (e.g., power BI 252 as shown in FIG. 3). A central computing system 328 can access the power BI module.

Figure 4:
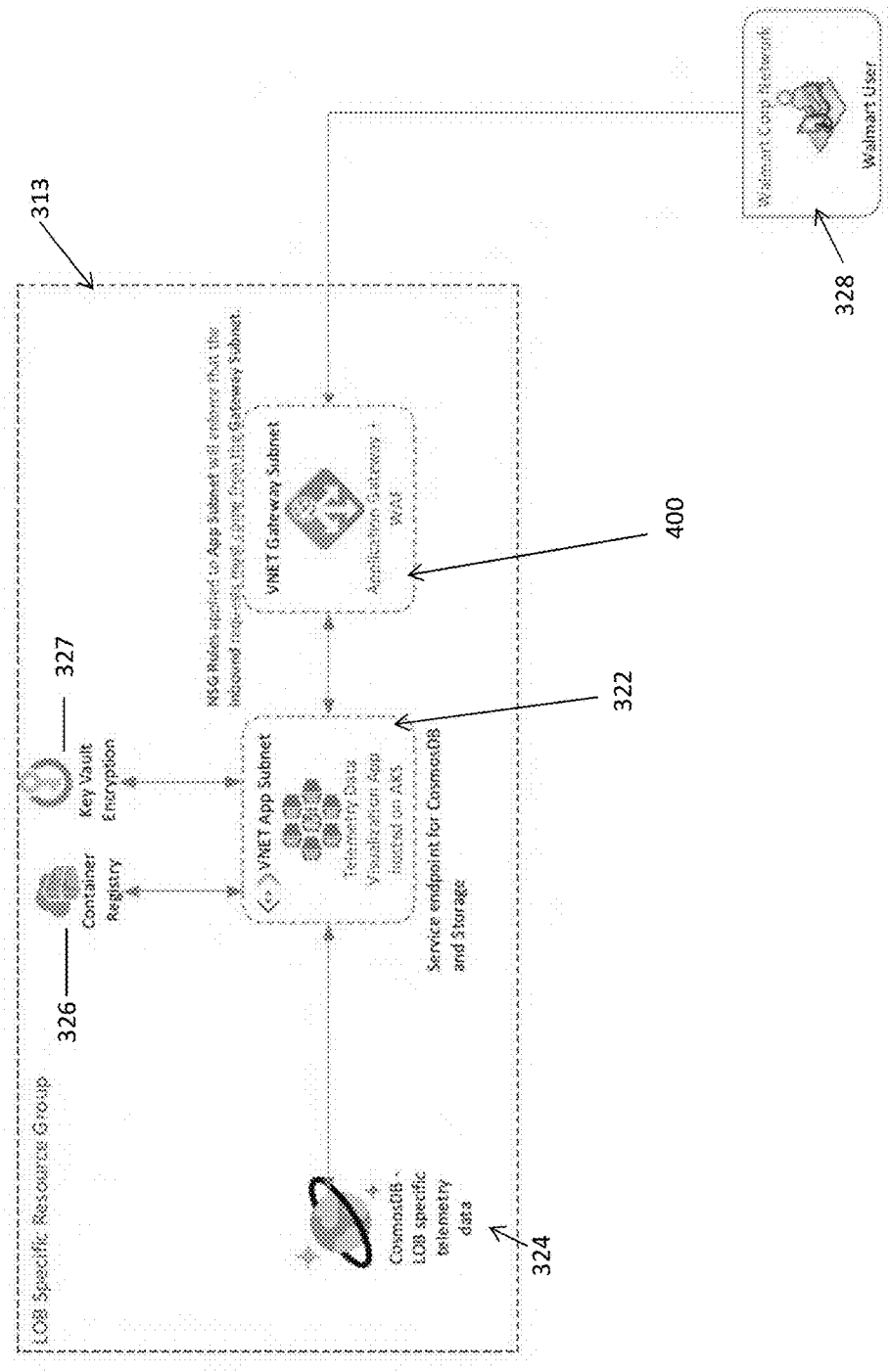
FIG. 4 is block diagram depicting a telemetry data visualization application according to an exemplary embodiment of the present disclosure.

FIG. 4 is block diagram depicting an IoT pipeline according to an exemplary embodiment of the present disclosure. In one embodiment, an IoT pipeline 313 can include a database 324, telemetry data visualization application 322, a container registry 326, a key vault encryption 327, and an application gateway. The database 328 can store telemetry data associated with an IoT device. The database 328 can communicate the telemetry data to the telemetry data visualization application 322. The telemetry data visualization application 322 can generate visualizations of the telemetry data associated with the IoT device. The central computing system 328 can access the visualizations generated by the telemetry data visualization application 322 using the application gateway 400.

Figure 5:
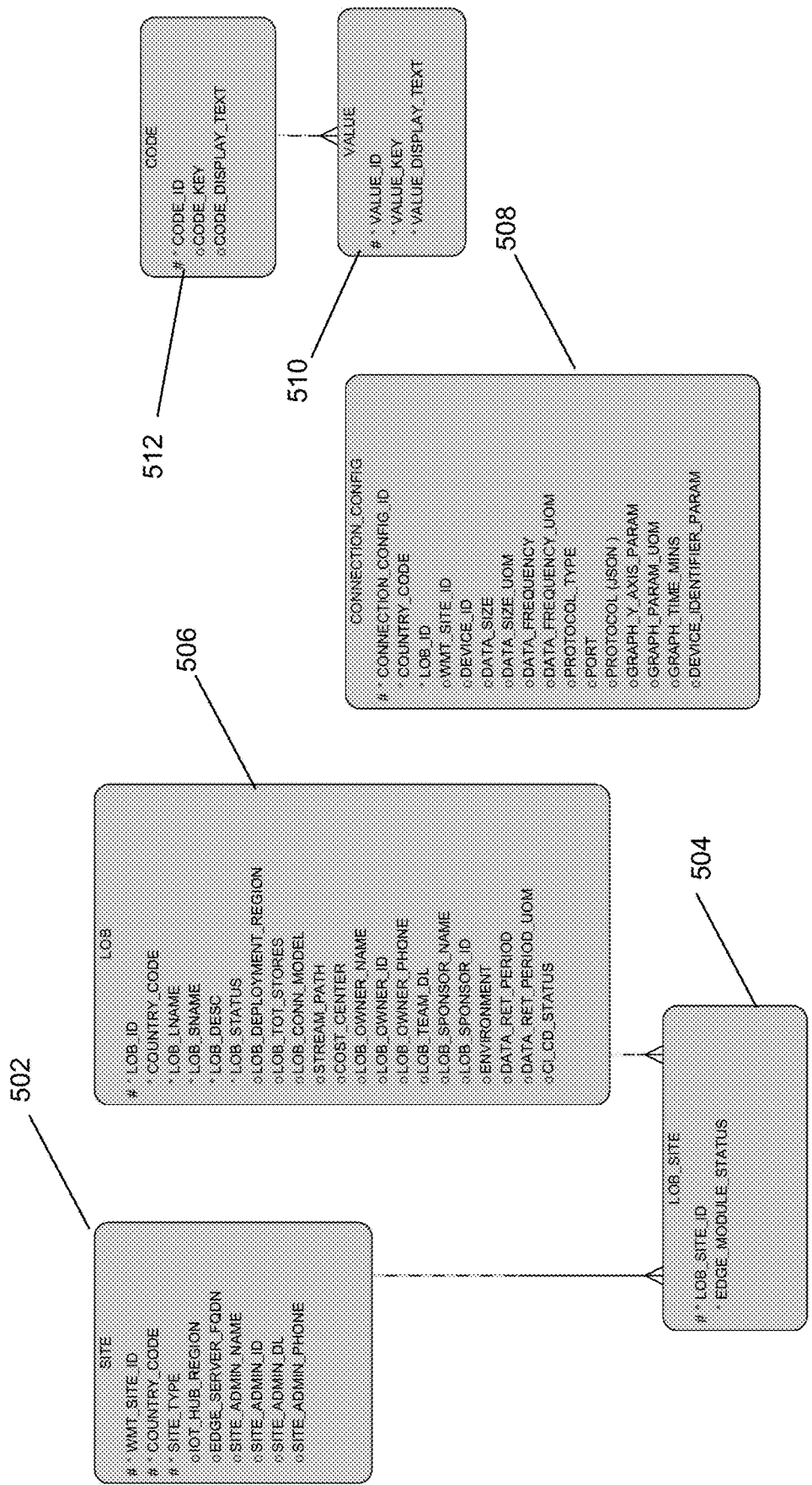
FIG. 5 depicts exemplary data tables according to an exemplary embodiment to the present disclosure.

FIG. 5 depicts exemplary data tables according to an exemplary embodiment to the present disclosure. In one embodiment, exemplary data tables can include a site table 502, LOB_Site table 504, a LOB table 506, a connection_config table 508, a code table 510, and a value table 512.

The site table 504 can include data associated with a facility such as site id, country code, site type, IoT hub region, Edge server FQDN, site admin name, site admin id, site admin dl, site admin phone number. The LOB site table 506 can include data associated with the IoT device operating in a facility such as data associated the IoT devices site id, and edge module status. The LOB table 508 can include data associated with the IoT device such as id, country code, LName, SName, description, status, deployment region, total stores, connection model, stream path, cost center, owner name, owner id, owner phone, team dl, sponsor name, sponsor id, environment, data retention period, data retention period UOM, and ci/cd status. The connection_config table 510 can include data associated with the connection such as id, country code, Lob id (i.e., IoT device id), site id, device serial number, data size, data size UOM, data frequency, data frequency UOM, protocol type, port, protocol (JSON), graph y axis parameter, graph parameter UOM, graph time MNS, and device identifier parameter. The code table 512 can include data associated with codes such as id, key, and display text. The value table 514 can include data associated with values such as id, key, and display text.

Figure 6A:
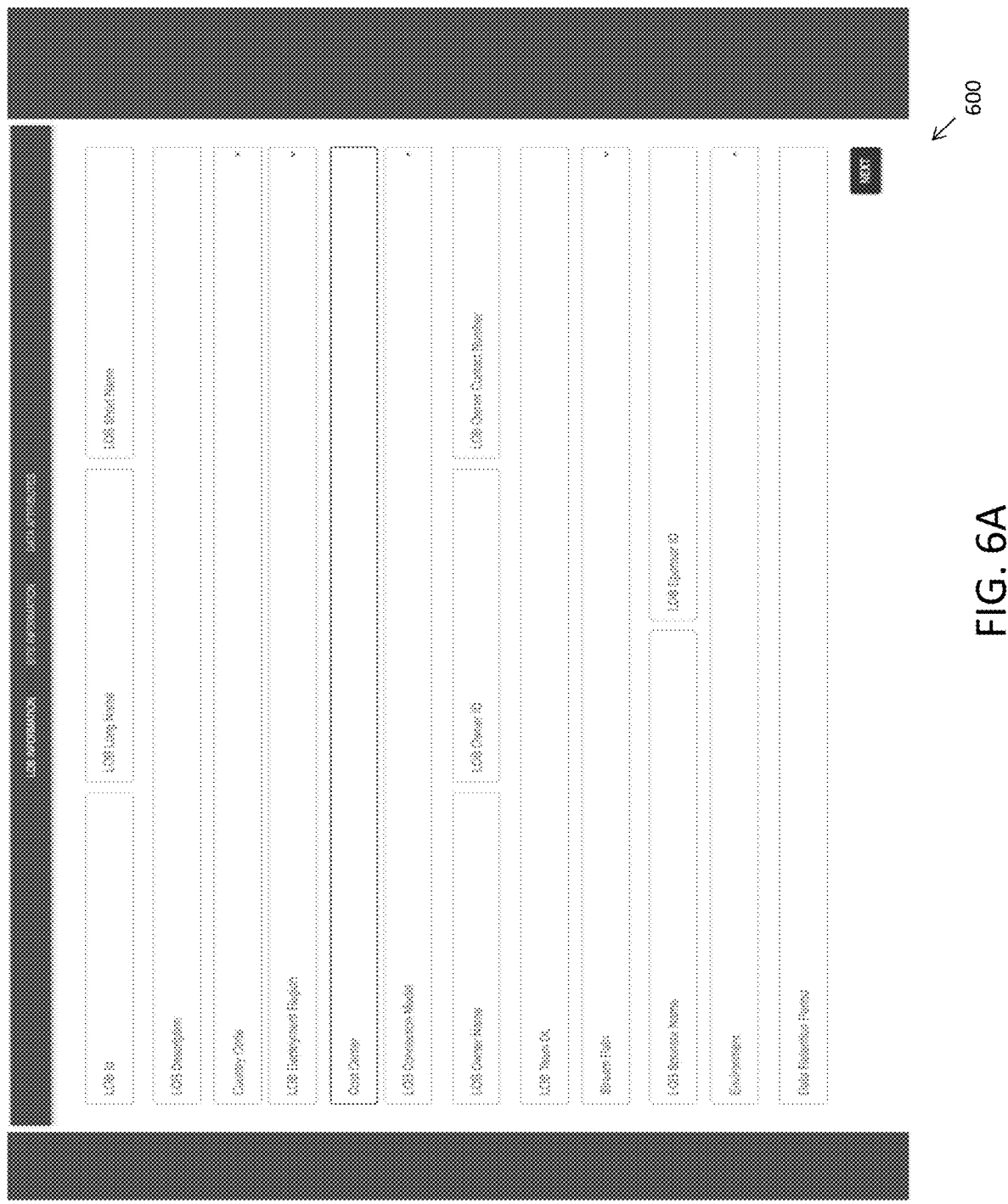
FIGS. 6A-C depict exemplary graphical user interfaces rendered on a user device according to an exemplary embodiment of the present disclosure.
Figure 6B:
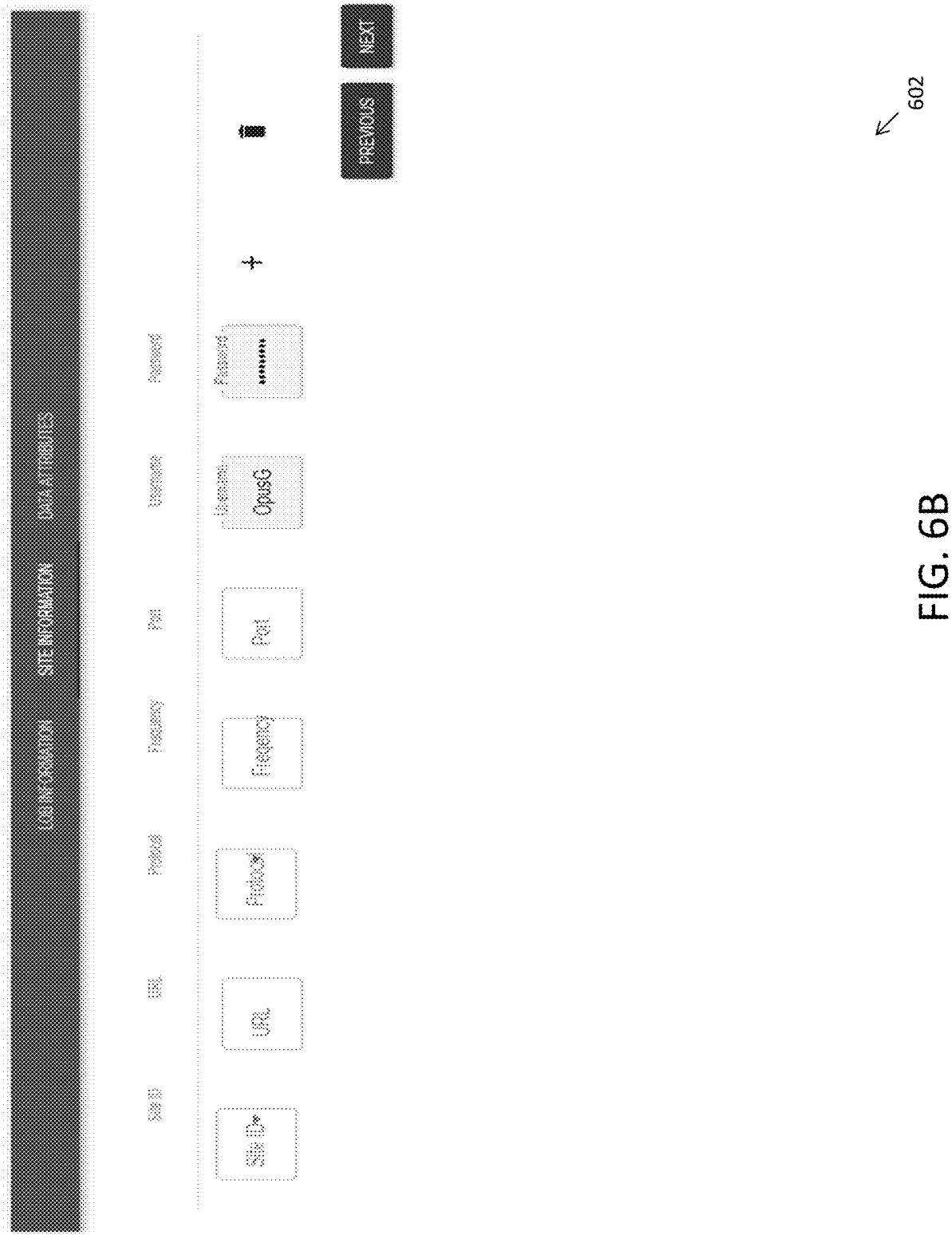
Figure 6C:
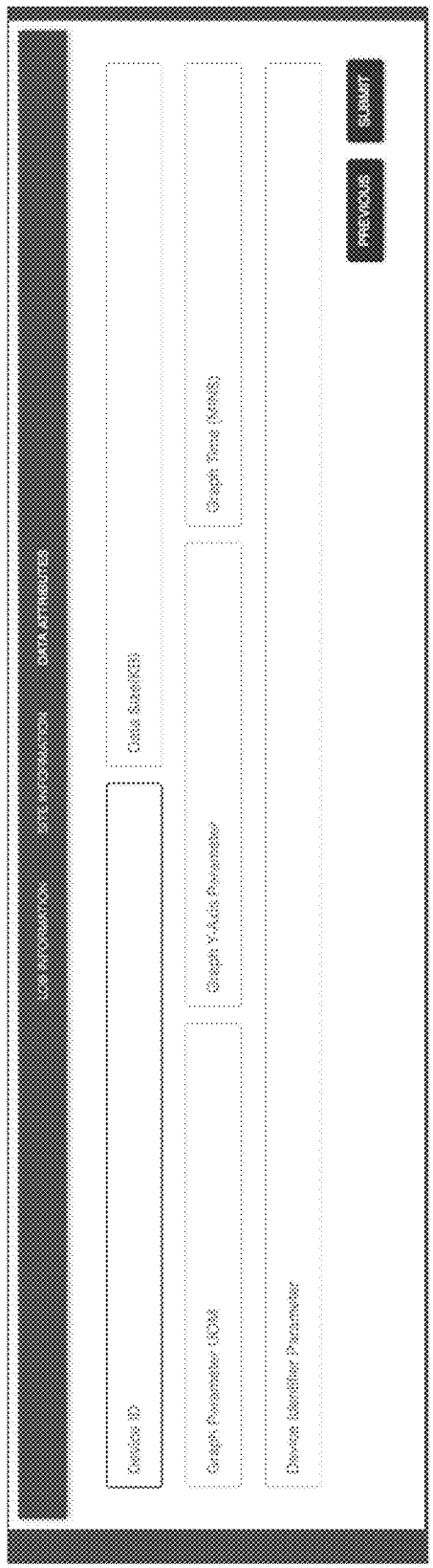

FIGS. 6A-C depict exemplary graphical user interfaces rendered on a user device according to an exemplary embodiment of the present disclosure. With reference to FIG. 6A, a user device (e.g., user device 160 as shown in FIG. 1) can render lob information tab 600 to collect information associated with the IoT device disposed in a facility. The lob information tab 600 can request information such as LOB ID (i.e., IoT device ID), LOB Name (i.e., IoT device name), LOB short name (i.e., IoT device short name), LOB description (i.e., IoT device description), country, cloud deployment region, cost center, LOB owner (i.e., IoT device owner), LOB owner contact number (i.e., IoT device owner contact number), LOB team DL (i.e., IoT device team DL), LOB Sponsor (VP) (i.e., IoT device sponsor), environment, data retention period (TTL mins). With reference to FIG. 6B, a user device can render the site information tab 602 to collect information associated with the site (i.e., facility). The site information tab 602 can request information such as Site ID, URL, protocol, port, username, and password. With reference to FIG. 6C, a user device can render the data attributes tab 604 to collect information associated with the IoT device disposed in a facility. The data attributes tab 604 can request information such as device id, data size, graph parameter UOM, graph Y-axis parameter, graph time (MINS), and device identifier parameter.

Figure 7:
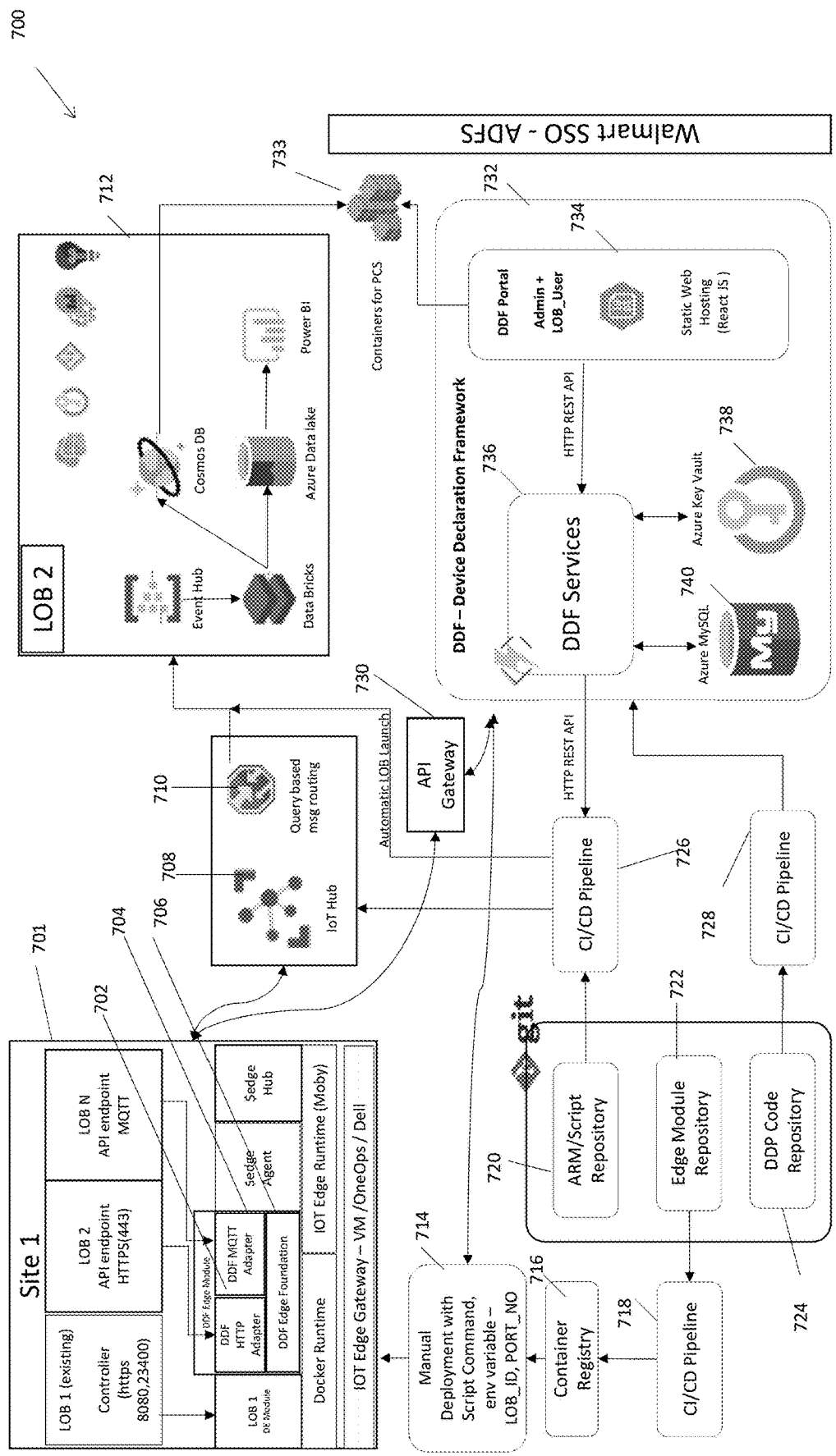
FIG. 7 depicts a device declaration framework (DDF) architecture in accordance with an exemplary embodiment.

FIG. 7 depicts a device declaration framework (DDF) architecture 700. The DDF architecture 700 can include a facility 700 which includes IoT devices. The facility 701 can include a controller and/or IoT edge device. The controller and/or IoT edge device can include modules corresponding to the IoT devices, edge Agent, edge Hub, docker runtime, IoT edge runtime, and IoT gateway. The controller and/or IoT edge device can further include a DDF HTTP Adapter 702, a DDF MQTT Adapter 704, and an DDF Edge Foundation 706.

The DDF architecture 700 can further include an IoT hub 708 and a query based routing module 712. The DDF architecture 700 can further include a IoT pipeline 712 and a DDF framework 732. The IoT pipeline 712 can include an event hub, data bricks, database, data lake, and a power BI module. The DDF framework 732 can include DDF portal 734, DDF services 736, key vault 738, and a database 740. The IoT pipeline 712 and DDF framework 732 can communicate with containers for computing devices 733.

In one embodiment, a user can access the DDF framework 732 through the DDF portal 734 to onboard an IoT device. The user can provide information associated with the IoT device through the DDF portal 734. The DDF services 736 can receive the request and information from the DDF portal 734 and can retrieve information associated with the IoT device from the database 740. The DDF Services 736 can initiate the onboarding process by transmitting the request to a code integration/code delivery (CI/CD) pipeline 726. The CI/CD pipeline 726 can route the onboarding request to the IoT hub 708 which can communicate with the controller and/or IoT edge device to onboard the IoT device. The CI/CD pipeline 726 can also initiate a subscription to the IoT pipeline 712 for the IoT device being on-boarded on the controller and/or IoT edge device.

In one embodiment, the edge module repository 722 can initiate an onboarding process by transmitting the request to the CI/CD pipeline 718. The CI/CD pipeline 718 can transmit the request to a container registry 716 which can in turn transmit the request to a manual deployment script 714. The manual deployment script 714 can manually onboard the IoT device on the controller and/or IoT edge device.

In one embodiment, the DDF framework 732 can communicate and receive information associated with the IoT device from the controller and/or IoT edge device through the API gateway 730. In one embodiment, the DDF framework 732 can interface with the manual deployment script to onboard the IoT device. In one embodiment, a Debian Documentation Project (DDP) Code repository can communicate with the DDF framework 732 through the CI/CD pipeline 728.

The DDF edge foundation 706 can use local file configuration mounted on Docker volume to get LOB_ID and PORT_NO. The DDF edge foundation 706 can further map host port to Docker port for exposing push API, connect to an IoT device twin (e.g., a similar IoT device) to get a storeID, connect to Module Twin (i.e., a similar IoT device module) to get DDF_API_URL and its DDF_API_AUTH and DDFConfigVersion, and call DDF Edge API to get LOB and store specific device configurations. The DDF edge foundation 706 can further launch portal adapters as per IoT device configurations. Additionally, the DDF edge foundation 706 can call DDF Edge API to get updated device configurations and update the adapters to with new configurations. When sending received data from controllers or devices, the DDF edge foundation 706 can send the data with this headers storeId, lobId and payload.

Figure 8A:
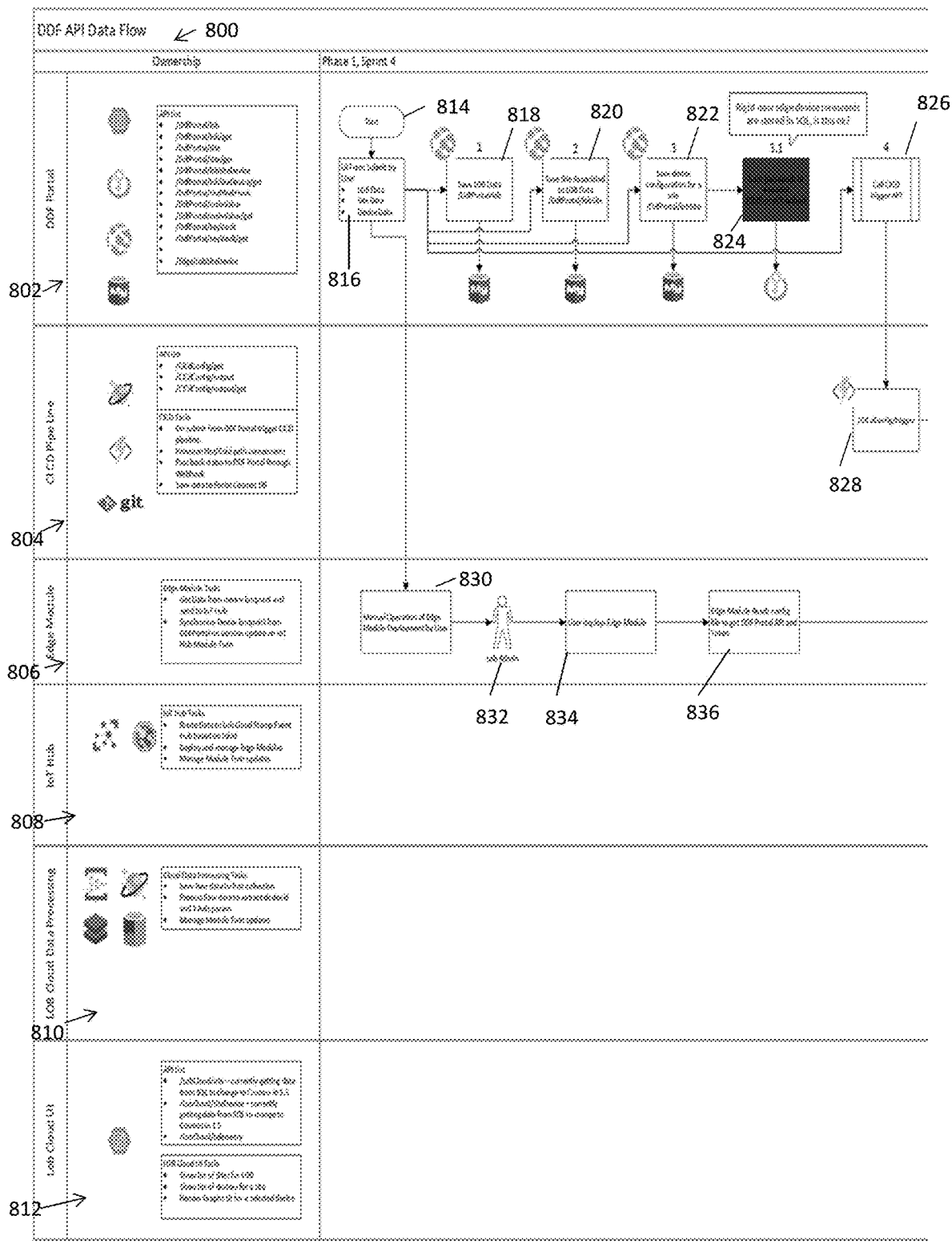
FIGS. 8A-8D depicts data flow in a DDF in accordance with an exemplary embodiment.

FIGS. 8A-8D depict data flow in a DDF in accordance with an exemplary embodiment. The DDF data flow 800 can depict a process of onboarding an IoT device at a facility and accessing visualizations of data collected from the IoT device. With reference to FIG. 8A, in one embodiment, the DDF data flow 800 can include a DDF portal layer 802, CI/CD Pipeline layer 804, an Edge Module layer 806, IoT Hub layer 808, LOB Cloud Data Processing layer 810, and LOB Cloud UI layer 812. The DDF portal layer 802 has an API list of /Ddfportal/lob; /Ddfportal/lob/get; /Ddfportal/site; /Ddfportal/site/get; /Ddfportal/lobSiteDevice; /Ddfportal/lobSiteDevice/get; /Ddfportal/cicdWebHook; /Ddfportal/codeValue; /Ddfportal/codeValue/get; /Ddfportal/keyVault; /Ddfportal/keyVault/get; and /Edge/LobSiteDevice.

The CI/CD Pipeline layer 804 can include an API list of /CiCdConfig/get; /CiCdConfig/output; and /CiCdConfig/output/get. The CI/CD Pipeline layer 804 can include the following CI/CD tasks: on submit from the DDF portal trigger CI/CD pipeline; provision hot/cold path components; pass back status of DDF portal through Webhook; and save data to the portal Cosmos database. The Edge Module layer 806 can include the following Edge Module tasks: Get Data from device Endpoint and send to the IoT Hub and synchronize device Endpoint from DDFPortal on Version update on IoTHub Module Twin. The IoT Hub layer 808 can include the following IoT Hub Tasks: Route Data to LOB Cloud Stamp Event Hub based on LOBid; deploy and manage Edge modules; and manage module twin updates. The LOB cloud data processing layer 810 can include the following cloud data processing tasks: save raw data to first collection; process raw data to extract device id and Y Axis parameter; and manage module twin updates. The Lob Cloud UI layer 812 can include an API list of /LobCloud/site; /LobCloud/siteDevice; and /LobCloud/telemetry. The Lob Cloud UI layer 812 can include the following LOB Cloud UI tasks: show list of sites for LOB; show lists of devices for a site; render and graphs UI for a selected device.

In the DDF portal layer, a user can initiate the process of onboarding an IoT device in a facility. In operation 814, the data flow can be initiated. In operation 816, a user can submit information associated with an IoT device to be on-boarded in a facility. The information can include LOB data, site (i.e., facility) data, and device (i.e., IoT device) data. In operation 818, the LOB data can be saved by using the /Ddfportal/lob API. In operation 820, the site associated with the LOB data can be saved by using the /Ddfportal/lobSite API. In operation 822, the device configuration for the site can be saved by using /Ddfportal/lobSite API. In operation 824 the passwords can be saved to KeyValut by using the /Ddfportal/KeyVault API. In operation 826, in response to the user submitting the information regarding onboarding the IoT device, the CI/CD trigger API can be called. In response to the CI/CD trigger API being called, in operation 828, in the CI/CD pipeline layer 804, the CI/CD trigger API can be executed by using the /CiCdConfig/trigger API.

In an alternative flow, in response to a user submitting information associated with an IoT Device to be on-boarded in a facility in operation 816, in operation 830, a manual operation of the Edge Module deployment by a LOB Admin 834 can be initiated. In operation 834, the LOB Admin 832 can deploy an edge module corresponding to the IoT device to be on-boarded. In operation 836, the Edge module can read the config file to get DDF Portal API and a token.

Figure 8B:
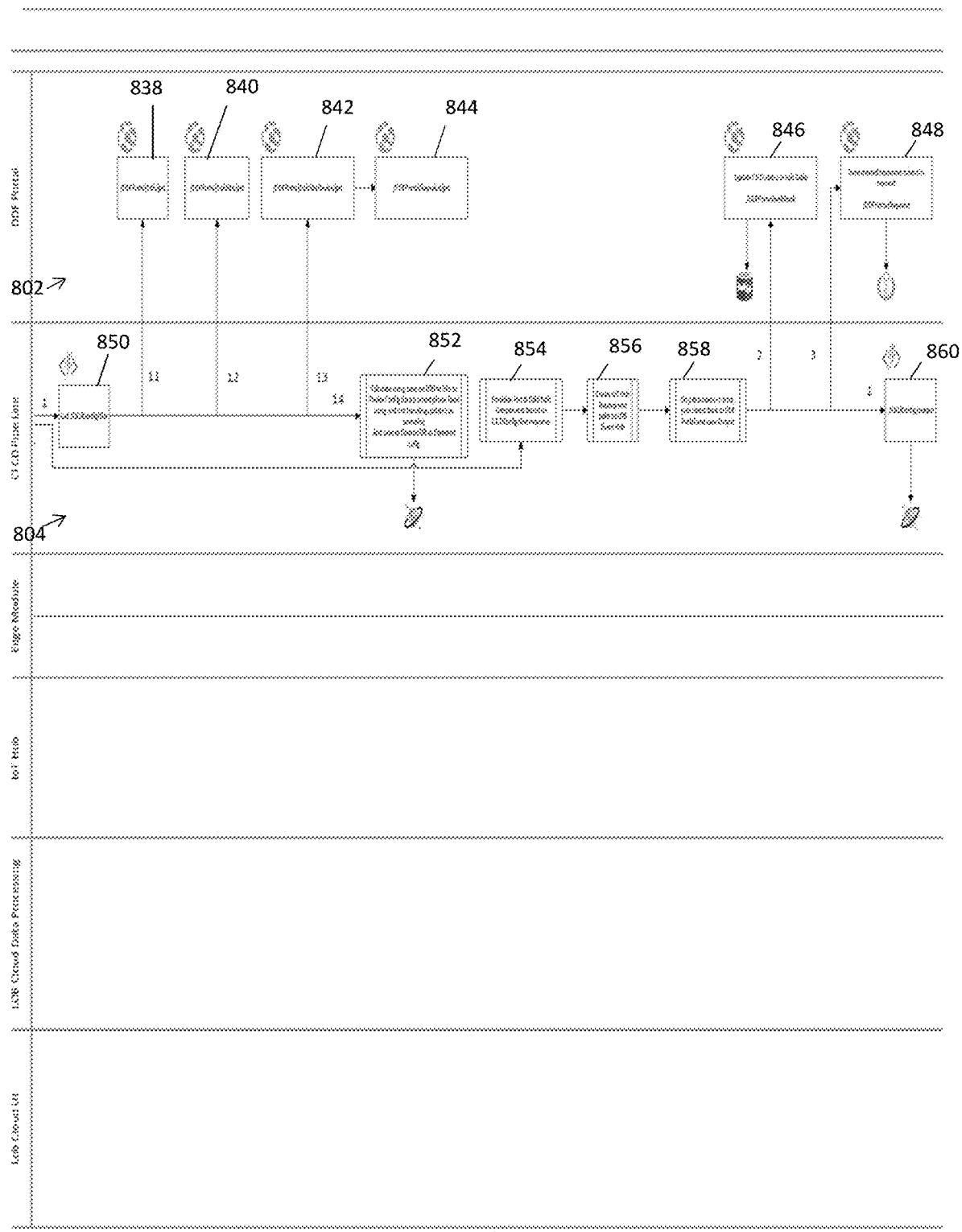

With reference to FIG. 8B and continuing from operation 828 as shown in FIG. 8A, in the CI/CD pipeline layer 804, in operation 850, the /CiCdConfig/get API can be called, which can initiate calls to the /DDFPortal/Lob/get API 838, /DDFPortal/LobSite/get API 840, /DDFPortal/LobSiteDevice/get API 842, and the /DDFPortal/keyVault/get API 844 in the DDF Portal layer 802. In operation 852, the CI/CD pipeline layer 804, sizing based on LOB to Site to Device Config data can be calculated and saved to Cosmos DB as expected configuration. In operation 854, hold and cold path components can be provisioned based on a response from the CICDConfig/get API. In operation 856, an IoT Hub routing endpoint to LOB event hub can be created. In operation 858, in response to success or receiving an error, the output can be sent to the DDF portal layer 802 for saving the output. A call can be initiated to the /DDFPortal/webHook API 846 to update CI/CD status in the Lob Table and call can be initiated to the /DDFPortal/keyVault API 848 to save created resource tokens in the key vault. In operation 860, a call to the /CiCdConfig/output can be initiated.

Figure 8C:
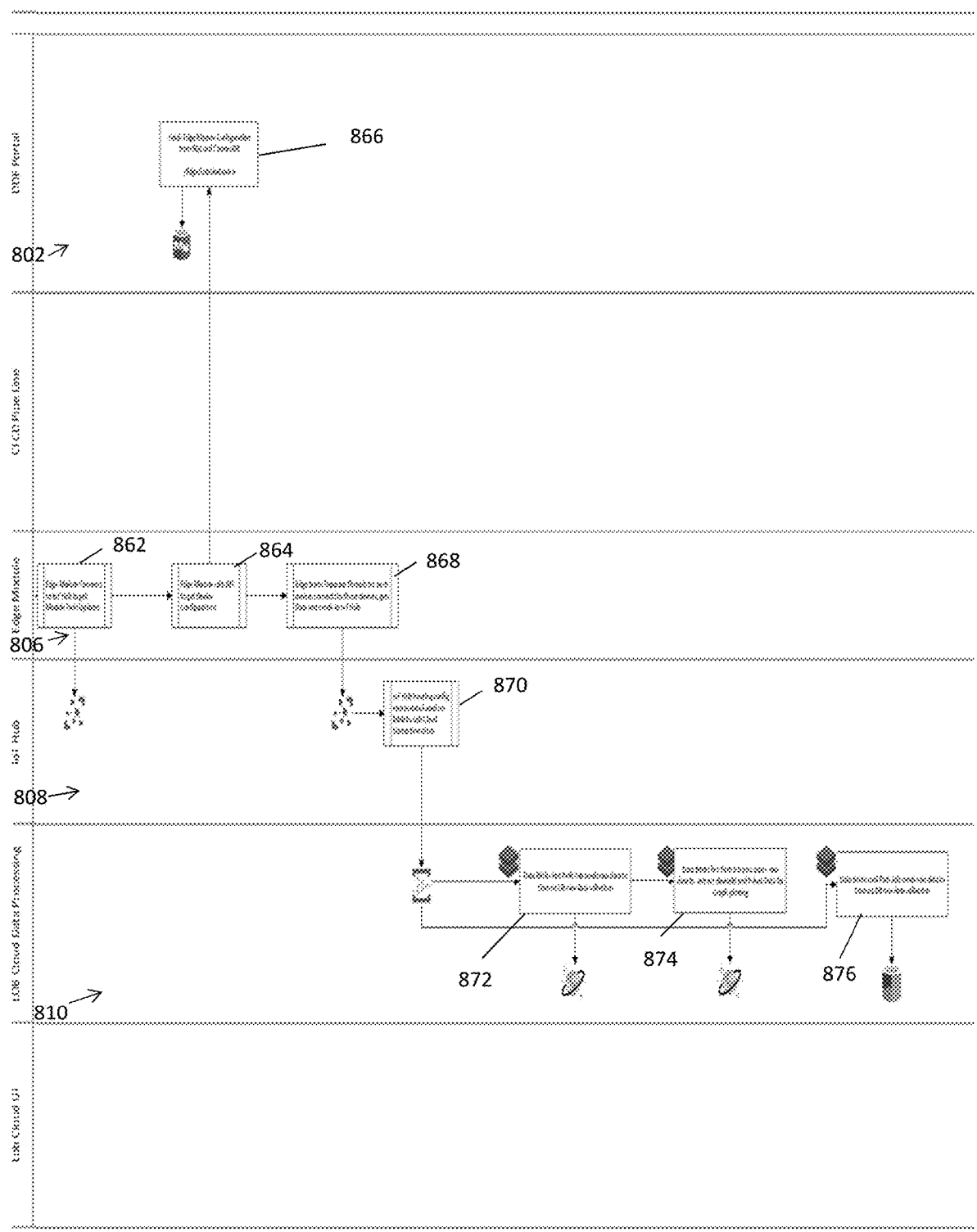

With reference to FIG. 8C and continuing from operation 836 as shown in FIG. 8A, in the Edge Module layer 806, in operation 862, the edge module connects to the IoT Hub to get Module Twin updates. In operation 864, the edge module calls an API to get device configurations. In operation 866, the fetch edge module configuration from SQL and Cosmos DB can be called by using the /Edge/LobSiteDevice API. In operation 868, in the Edge Module layer 806, the edge starts separate threads for each device, connects to those devices, gets Data and sends to IoT Hub.

In operation 870, in the IoT Hub layer 808, the IoT Hub routing config routes data based on LOBid to LOB Cloud Stamp Event Hub. In operation 872, in the LOB Cloud Data Processing layer 810, the data bricks hot path sends raw data to Cosmos DB data collection. In operation 874, the data bricks hot path job processes raw data to extract deviceId and Y-axis data for graph plotting. In operation 876, the data bricks cold path job sends raw data to the Cosmos DB raw data collection.

Figure 8D:
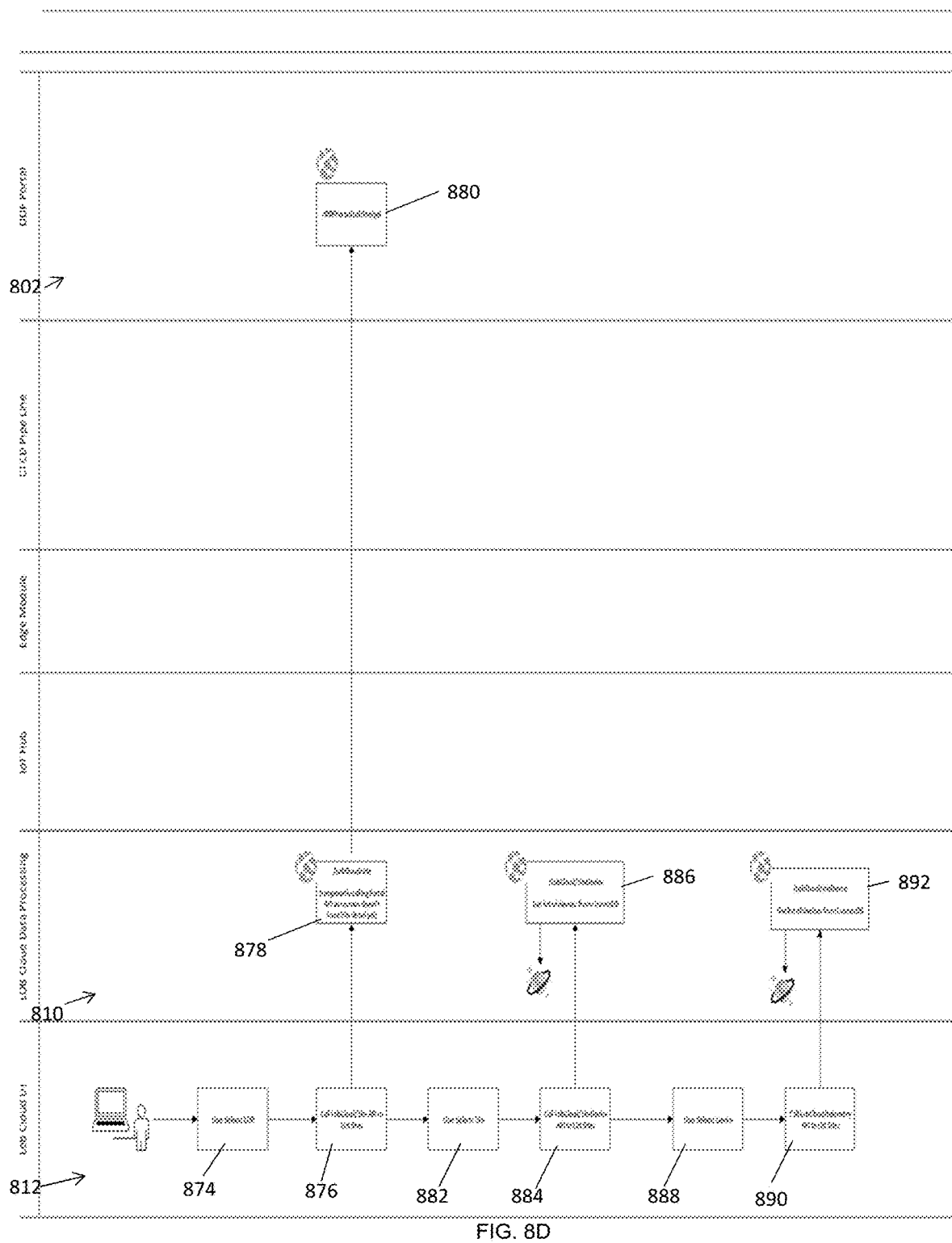

With reference to FIG. 8D, in the LOB Cloud UI layer 812, in operation 874, a user can select a LOB (i.e., one or more IoT devices). In operation 876, the LOBCloud/API can be called to list the sites of the selected LOB. In the LOB Cloud Data Processing layer 810, in operation 878 the /LobCloud/site API can be called. In operation 880, in the DDF Portal layer 802 the DDFPortal/LobSite/get API can be called. In operation 882, a user can select a site (i.e., facility). In operation 884, a call to the LOBCloud/SiteDevice/API to list sites can be called. In operation 886, in the LOB Cloud Data Processing layer 810, the /LobCloud/siteDevice API can be called to get a list of devices from the Cosmos DB. In operation 888, in the LOB Cloud UI layer 812, the user can select a device. In operation 890 the LobCloud/telemetry API can be called to list sites. In operation 892, in the LOB Cloud Data Processing layer 810, the /LobCloud/siteDevice API can be called to get a list of devices from the CosmosDB.

Figure 9:
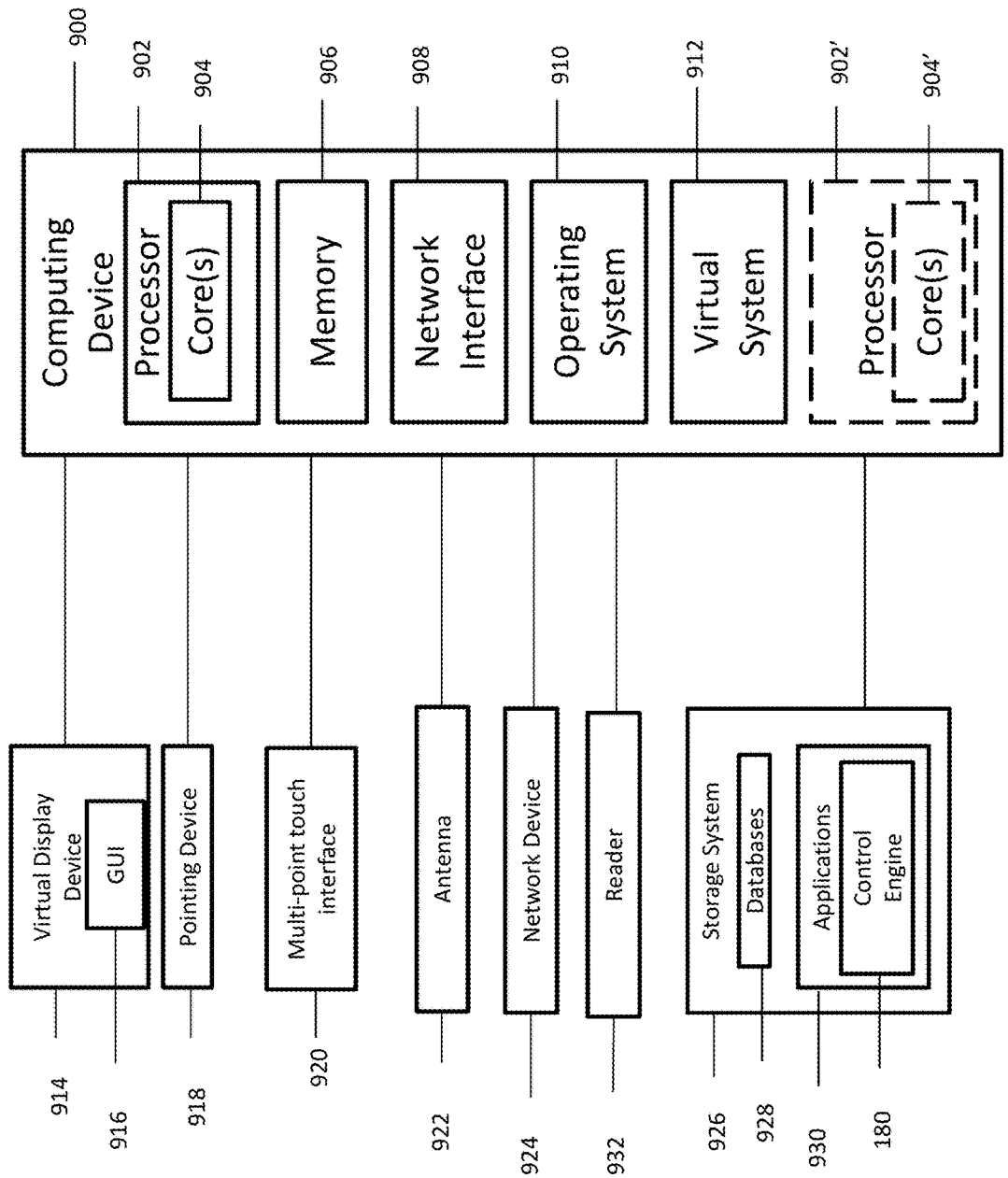
FIG. 9 is a block diagram illustrating of an exemplary computing device in accordance with exemplary embodiments of the present disclosure.

FIG. 9 is a block diagram of an example computing device for implementing exemplary embodiments. The computing device 900 may be, but is not limited to, a smartphone, laptop, tablet, desktop computer, server or network appliance. The computing device 900 can be embodied as part of the computing system, distributed computing system, and/or user device. The computing device 900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 906 included in the computing device 900 may store computer-readable and computer-executable instructions or software (e.g., applications 930, which can include the control engine 180) for implementing exemplary operations of the computing device 900. The computing device 900 also includes configurable and/or programmable processor 902 and associated core(s) 904, and optionally, one or more additional configurable and/or programmable processor(s) 902' and associated core(s) 904' (for example, in the case of computer systems having multiple processors/cores), for executing computer-readable and computer-executable instructions or software stored in the memory 906 and other programs for implementing exemplary embodiments. Processor 902 and processor(s) 902' may each be a single core processor or multiple core (904 and 904') processor. Either or both of processor 902 and processor(s) 902' may be configured to execute one or more of the instructions described in connection with computing device 900.

Virtualization may be employed in the computing device 900 so that infrastructure and resources in the computing device 900 may be shared dynamically. A virtual machine 912 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 900 through a visual display device 914, such as a computer monitor, which may display one or more graphical user interfaces 916, multi-touch interface 920, a pointing device 918, a scanner 936 and a reader 932. The scanner 936 and reader 932 can be configured to read sensitive data.

The computing device 900 may also include one or more storage devices 926, such as a hard-drive, CD-ROM, or other computer readable media, for storing data and computer-readable instructions and/or software that implement exemplary embodiments (e.g., applications i.e. the control engine 180). For example, exemplary storage device 926 can include one or more databases 928 for storing information regarding facilities and IoT devices. The databases 928 may be updated manually or automatically at any suitable time to add, delete, and/or update one or more data items in the databases.

The computing device 900 can include a network interface 908 configured to interface via one or more network devices 924 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 922 to facilitate wireless communication (e.g., via the network interface) between the computing device 900 and a network and/or between the computing device 900 and other computing devices. The network interface 908 may include a built-in network adapter, network interface card, PCMCIA network card, card bus network adapter, wireless network adapter, USB network adapter, modem or any other device suitable for interfacing the computing device 900 to any type of network capable of communication and performing the operations described herein.

The computing device 900 may run operating system 910, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 900 and performing the operations described herein. In exemplary embodiments, the operating system 910 may be run in native mode or emulated mode. In an exemplary embodiment, the operating system 910 may be run on one or more cloud machine instances.

Figure 10:
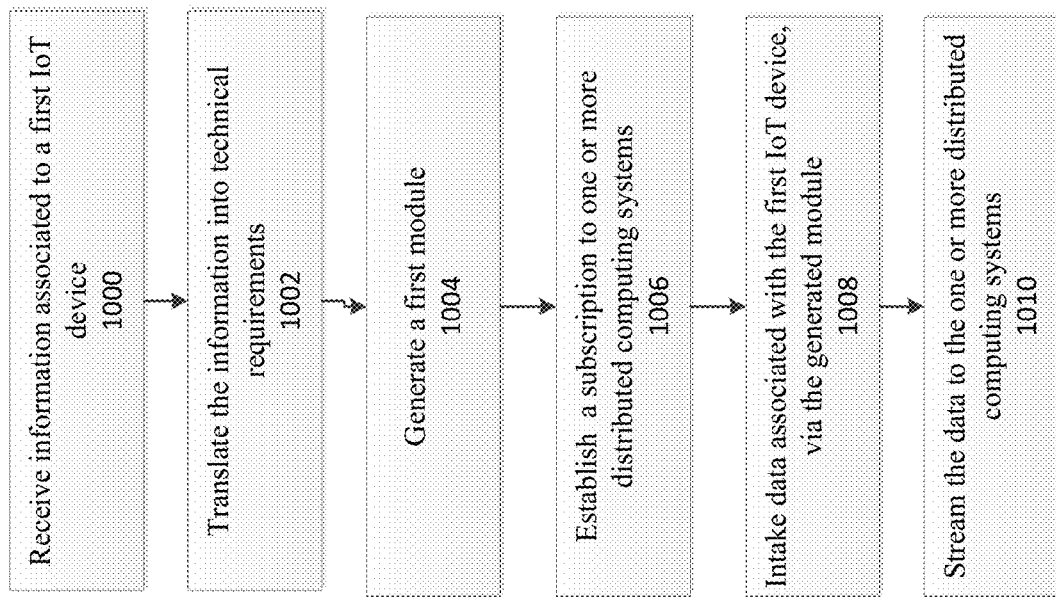
FIG. 10 is a flowchart illustrating an exemplary process in accordance with exemplary embodiments of the present disclosure.

FIG. 10 is a flowchart illustrating an embodiment of the system for onboarding an IoT device. In operation 1000, a computing system (e.g., computing system 175 as shown in FIG. 1) in communication with a user device (e.g., user device 160 as shown in FIG. 1) and a controller (controller 124 or 129 as shown in FIG. 1) disposed in a facility (e.g., first facility 120 or second facility 128 as shown in FIG. 1) can receive information associated to a first IoT device (e.g., IoT devices 122*a-n* or 126*a-n*) disposed in the facility, from the user device. In operation 1002, the computing system can translate the information into technical requirements associated with the first IoT device. In operation 1004, the computing system can generate a first module (e.g., modules 202-206 or 218-222) in the controller disposed in the facility to facilitate communication between the controller and the first IoT device using the technical requirements associated with the first IoT device. The first module corresponds to the first IoT device. In operation 1006, the computing system can establish a subscription to one or more distributed computing systems, to initiate communication associated with the first IoT device between the controller and the one or more distributed computing systems.

In operation 1008, the controller can intake data associated with the first IoT device, via the generated module. In operation 1110, the controller can stream the data to the one or more distributed computing systems.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system to establish communication with an IoT device, the system comprising:
   a controller disposed in a respective facility, the controller comprising one or more modules that facilitate communication with corresponding IoT devices, wherein each module of the one or more modules is generated by a computing system distinct and separate from the controller, and wherein each of the one or more modules corresponds to a respective IoT device of the corresponding IoT devices;
   the computing system in communication with the controller, the computing system configured to:
   receive information associated to a first IoT device disposed in the respective facility from a user device;
   translate the information into technical requirements associated with the first IoT device;
   generate a first module in the controller disposed in the respective facility using the technical requirements associated with the first IoT device to facilitate communication between the controller and the first IoT device, wherein the first module corresponds to the first IoT device; and
   establish a subscription to one or more distributed computing systems to initiate communication of data associated with the first IoT device between the controller and the one or more distributed computing systems;
   wherein the controller is configured to:
   intake the data associated with the first IoT device, via the first module; and
   stream the data to the one or more distributed computing systems.

2. The system of claim 1, wherein the one or more distributed computing systems are configured to perform data analytics using the data associated with the first IoT device, and wherein the one or more distributed computing systems are distinct and separate from the computing system.

3. The system of claim 2, wherein the one or more distributed computing systems includes a first distributed computing system and a second distributed computing system, and wherein the first distributed computing system is configured to perform the data analytics using corresponding data associated with each of the first IoT device and another IoT in another facility.

4. The system of claim 3, wherein the first distributed computing system performs the data analytics for data stored over a longer duration of time than the second distributed computing system.

5. The system of claim 2, wherein the data analytics includes generating a time series model for a short and long time duration of data.

6. The system of claim 1, wherein a second IoT device and a third IoT device are disposed in the respective facility.

7. The system of claim 2, wherein the controller includes a second module corresponding to a second IoT device and a third module corresponding to a third IoT device.

8. The system of claim 1, wherein the first IoT device includes an Application Program Interface (API) to communicate with the first module of the controller.

9. A method to establish communication with an IoT device, the method comprising:
   receiving, via a computing system in communication with a user device and a controller disposed in a respective facility, information associated to a first IoT device disposed in the respective facility, from the user device, wherein the controller comprises one or more modules that facilitate communication with corresponding IoT devices, wherein each module of the one or more modules is generated by the computing system distinct and separate from the controller and wherein each of the one or more modules corresponds to a respective IoT device of the corresponding IoT devices;
   translating, via the computing system, the information into technical requirements associated with the first IoT device;
   generating, via the computing system, a first module in the controller disposed in the respective facility to facilitate communication between the controller and the first IoT device using the technical requirements associated with the first IoT device, wherein the first module corresponds with the first IoT device; and
   establishing, via the computing system, a subscription to one or more distributed computing systems, to initiate communication of data associated with the first IoT device, between the controller and the one or more distributed computing systems;
   in-taking, via the controller, the data associated with the first IoT device, via the first module; and
   streaming, via the controller, the data to the one or more distributed computing systems.

10. The method of claim 9, wherein the one or more distributed computing systems are configured to perform data analytics using the data associated with the first IoT device, and wherein the one or more distributed computing systems are distinct and separate from the computing system.

11. The method of claim 10, wherein the one or more distributed computing systems includes a first distributed computing system and a second distributed computing system, and wherein the first distributed computing system is configured to perform the data analytics using corresponding data associated with each of the first IoT device and another IoT in another facility.

12. The method of claim 11, wherein the first distributed computing system performs the data analytics for data stored over a longer duration of time than the second distributed computing system.

13. The method of claim 12, wherein the data analytics includes generating a time series model for a short and long time duration of data.

14. The method of claim 9, wherein a second IoT device and a third IoT device are disposed in the respective facility.

15. The method of claim 10, wherein the controller includes a second module corresponding to a second IoT device and a third module corresponding to a third IoT device.

16. The method of claim 9, wherein the first IoT device includes an Application Program Interface (API) to communicate with the first module of the controller.

17. A non-transitory computer-readable storage device configured to store instructions executable by a processing device, wherein execution of the instructions causes the processing device to implement a method of onboarding an IoT device comprising:

receiving, via a computing system in communication with a user device and a controller disposed in a respective facility, information associated to a first IoT device disposed in the respective facility, from the user device, wherein the controller comprises one or more modules that facilitate communication with corresponding IoT devices, wherein each module of the one or more modules is generated by the computing system distinct and separate from the controller, and wherein each of the one or more modules corresponds to a respective IoT device of the corresponding IoT devices;

translating, via the computing system, the information into technical requirements associated with the first IoT device;

generating, via the computing system, a first module in the controller disposed in the respective facility to facilitate communication between the controller and the first IoT device using the technical requirements associated with the first IoT device, wherein the first module corresponds with the first IoT device; and establishing, via the computing system, a subscription to one or more distributed computing systems, to initiate communication of data associated with the first IoT device, between the controller and the one or more distributed computing systems;

in taking, via the controller, the data associated with the first IoT device, via the first module;

streaming, via the controller, the data to the one or more distributed computing systems.

18. The non-transitory computer-readable storage device of claim 17, wherein the one or more distributed computing systems are configured to perform data analytics using the data associated with the first IoT device, and wherein the one or more distributed computing systems are distinct and separate from the computing system.

19. The non-transitory computer-readable storage device of claim 18, wherein the one or more distributed computing systems includes a first distributed computing system and a second distributed computing system, and wherein the first distributed computing system is configured to perform the data analytics using corresponding data associated with each of the first IoT device and another IoT in another facility.

20. The non-transitory computer-readable storage device of claim 19, wherein the first distributed computing system performs the data analytics for data stored over a longer duration of time than the second distributed computing system.

* * * * *